(12) United States Patent
Nojima et al.

(10) Patent No.: US 7,439,704 B2
(45) Date of Patent: Oct. 21, 2008

(54) INVERTER DEVICE AND INVERTER MODULE

(75) Inventors: Kenji Nojima, Gunma (JP); Shigeharu Sasaki, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 102 days.

(21) Appl. No.: 11/127,207

(22) Filed: May 12, 2005

(65) Prior Publication Data

US 2005/0254275 A1 Nov. 17, 2005

(30) Foreign Application Priority Data

May 17, 2004 (JP) ............................. 2004-146117
May 17, 2004 (JP) ............................. 2004-146119

(51) Int. Cl.
*B60H 1/32* (2006.01)

(52) U.S. Cl. ....................... 318/801; 318/442

(58) Field of Classification Search ......... 318/801–811, 318/700, 798, 442, 432, 139, 789, 680, 800; 363/48–59, 95, 98, 135, 34, 37, 96; 361/90, 361/91, 100, 56, 111
See application file for complete search history.

(56) References Cited

U.S. PATENT DOCUMENTS 4,843,533 A * 6/1989 Roof et al. .................... 363/55
5,130,628 A * 7/1992 Owen .......................... 318/780
5,883,484 A * 3/1999 Akao ........................... 318/700
6,049,185 A * 4/2000 Ikeda ........................... 318/442
2003/0173922 A1 9/2003 Pelonis

FOREIGN PATENT DOCUMENTS

| JP | 03-022867 | 1/1991 |
| JP | 2000-278802 | 10/2000 |
| JP | 2001-327001 | 11/2001 |
| JP | 2002-233165 | 8/2002 |
| JP | 3341327 | 8/2002 |
| JP | 2003-102101 | 4/2003 |

OTHER PUBLICATIONS

Japanese Office Action issued in corresponding Japanese Patent Application No. 2004-146117 dated Dec. 25, 2006.

* cited by examiner

*Primary Examiner*—Rajnikant B Patel
(74) *Attorney, Agent, or Firm*—McDermott Will & Emery LLP

(57) ABSTRACT

An object is to provide an inverter device capable of detecting the welding of a switching device in early stages, and in summary, the inverter device is equipped with a parallel circuit of a charging circuit and a switch connected between a battery and an inverter module, and comprises a capacitor charged from the battery via the charging circuit; a resistor to discharge the capacitor; a serial circuit including resistors to detect a voltage after the switch; and a diode connected between a connection point of the serial circuit including the resistors on a positive line and a connection point of the capacitor, and directed forward to the capacitor side.

5 Claims, 7 Drawing Sheets

INVERTER DEVICE AND INVERTER MODULE

BACKGROUND OF THE INVENTION

1. Field of the Invention

The present invention relates to an inverter device comprising a parallel circuit of a charging device and a switching device connected between a DC power source and an inverter, and to an inverter module comprising a switching element group provided in a mold package to convert a DC voltage into a three-phase pseudo AC voltage by switching.

2. Description of the Related Art

Recently, an air conditioner equipped with an electrically driven compressor driven by a battery power source has been developed as an air conditioner for an electric automobile. This air conditioner comprises, as shown in FIG. 7, a battery (DC power source) 401, an inverter device 408 and an electrically driven compressor 410.

The inverter device 408 comprises a switch 402 as a switching device connected in serial to the battery 401; a charging device 411 connected in parallel to this switch 402 and including a resistor 404 and a switch 403; an inverter module 405 configured by molding, into a mold package 415, a switching element group 412 including a switching element 414 and an unshown diode to absorb a switching surge; and a capacitor 406. The switching element group 412 of the inverter module 405 converts a DC voltage from the battery 401 into a three-phase pseudo AC voltage, and applies it to the electrically driven compressor 410 to drive a motor of the electrically driven compressor 410.

The capacitor 406 stably supplies a voltage to the switching element group 412. The resistor 404 of the charging device 411 restricts an incoming current through the capacitor 406 when the DC voltage of the battery 401 is applied. That is, the presence of the resistor 404 makes it possible to, when the battery 401 is connected, open the switch 402, close the switch 403, and pass a current via the resistor 404, thereby restricting the incoming current produced when the voltage of the battery 401 is applied (e.g., refer to Japanese Patent Publication Laid-open No. 3341327).

On the other hand, in such an air conditioner, the switch 402 might be welded to remain in a closed state despite a command being issued by an unshown controller to open the switch 402. Thus, heretofore, voltage dividing resistors have been provided before and after the switch 402, and terminal voltages of these voltage dividing resistors have been detected to check the occurrence of welding of the switch 402. That is, voltage detection circuits are respectively connected between a positive line 416 that is located between the switch 402 and the previous battery 401, and a negative line 418, and between the positive line 416 that is located between the switch 402 and the subsequent switching element group 412, and the negative line 418 of the battery 401, and the voltage detected by each of the voltage detection circuits is input to the controller.

Here, in a state where the battery 401 is connected, the voltage input from the voltage detection circuit before the switch 402 to the controller is substantially the voltage of the battery 401, regardless of whether the switch 402 is opened or closed. The voltage input to the controller from the voltage detection circuit after the switch 402 will be zero if the switch 402 is opened, and the voltage will be substantially the same as the voltage from the voltage detection circuit before the switch 402 (with a slight voltage drop) when the switch 402 is closed. This makes it possible to detect whether the switch 402 is opened or closed from the voltages of the voltage detection circuits before and after the switch 402 input to the controller. It is thus possible to judge the state where the switch 402 is closed even though the switch 402 is controlled to be opened by the controller, the so-called welding of the switch 402.

However, the high-capacity capacitor 406 is placed in the inverter device 408 as described above, and a measured voltage is not immediately reduced due to a discharge voltage of the capacitor 406, so that it has not been possible to detect the welding of the switch 402 in early stages.

On the other hand, in such an air conditioner, when the battery 401 is reversely connected, the capacitor 406 and the switching element group 412 are damaged. Further, there is a disadvantage that when a person touches a terminal on the battery 401 side, the person gets an electric shock because of the charged capacitor 406. In order to prevent this, conventionally, a diode directed forward to the capacitor 406 side has sometimes been attached to the charging device 411.

However, the addition of the diode leads to an increase in size of the entire device. On the other hand, especially in the air conditioner for the electric automobile, because the inverter device is installed on a vehicle to drive the electrically driven compressor, it has to be placed in a small engine room having limited installation space, so that the size increase is not allowed, and a further size reduction has been needed.

SUMMARY OF THE INVENTION

The present invention has been attained to solve the foregoing problem of prior art, and it is an object of the present invention to provide an inverter device capable of detecting the welding of a switching device in early stages.

It is another object of the present invention to provide an inverter module capable of reducing installation space.

That is, an inverter device of the present invention is equipped with a parallel circuit of a charging device and a switching device connected between a DC power source and an inverter, and comprises a capacitor charged from the DC power source via the charging device; a resistor to discharge this capacitor; a voltage detection circuit which detects a voltage after the switching device; and a diode connected between the voltage detection circuit and the capacitor and directed forward to the capacitor side.

Furthermore, the inverter device of the present invention comprises, in the invention described above, a controller which judges whether the switching device is welded in accordance with a voltage detected by the voltage detection circuit.

Furthermore, in the inverter device of the present invention, the controller, in the invention described above, compares a voltage before the switching device with the voltage detected by the voltage detection circuit, and when a difference therebetween is within a predetermined range, judges that the switching device is welded.

According to this invention, an inverter device is equipped with a parallel circuit of a charging device and a switching device connected between a DC power source and an inverter, and comprises a capacitor charged from the DC power source via the charging device; a resistor to discharge this capacitor; a voltage detection circuit which detects a voltage after the switching device; and a diode connected between the voltage detection circuit and the capacitor and directed forward to the capacitor side, whereby the diode instantly reduces a voltage value of the voltage detection circuit as long as the switching device is normally opened up even before the capacitor is completely discharged.

On the other hand, when the switching device is welded, the voltage of the voltage detection circuit is not reduced.

Therefore, for example, in accordance with the voltage detected by the voltage detection circuit, the voltage before the switching device is compared with the voltage detected by the voltage detection circuit, and when a difference therebetween is within a predetermined range, it is judged that the switching device is welded, such that the welding can be identified in early stages.

Furthermore, an inverter module of the present invention comprises a switching element group provided in a mold package to convert a DC voltage into a three-phase pseudo AC voltage by switching, wherein a diode provided between a DC power source and the switching element group and directed forward to the switching element group side is integrally molded into the mold package.

Still further, in the inverter module of the invention, there is provided, in the invention described above, a pin to connect, to a forward side of the diode, a capacitor charged from the DC power source via a charging device.

According to this invention, in an inverter module comprising a switching element group provided in a mold package to convert a DC voltage into a three-phase pseudo AC voltage by switching, a diode provided between a DC power source and the switching element group and directed forward to the switching element group side is integrally molded into the mold package, whereby a significant size reduction can be achieved as compared with the case in which the diode to prevent damages and electric shocks due to reverse connection of the DC power source is provided in an external substrate, and the installation space can be reduced. Moreover, the molding allows heat release of the diode and also allows an insulation distance to be secured at the same time, which makes it possible to configure a high-performance inverter module.

Furthermore, there is provided a pin to connect, to a forward side of the diode, the capacitor charged from the DC power source via the charging device, so that the diode and capacitor can be connected without trouble.

DETAILED DESCRIPTION OF THE PREFERRED EMBODIMENT

Embodiments of the present invention will be described below in detail with reference to the drawings.

Embodiment 1

Figure 1:
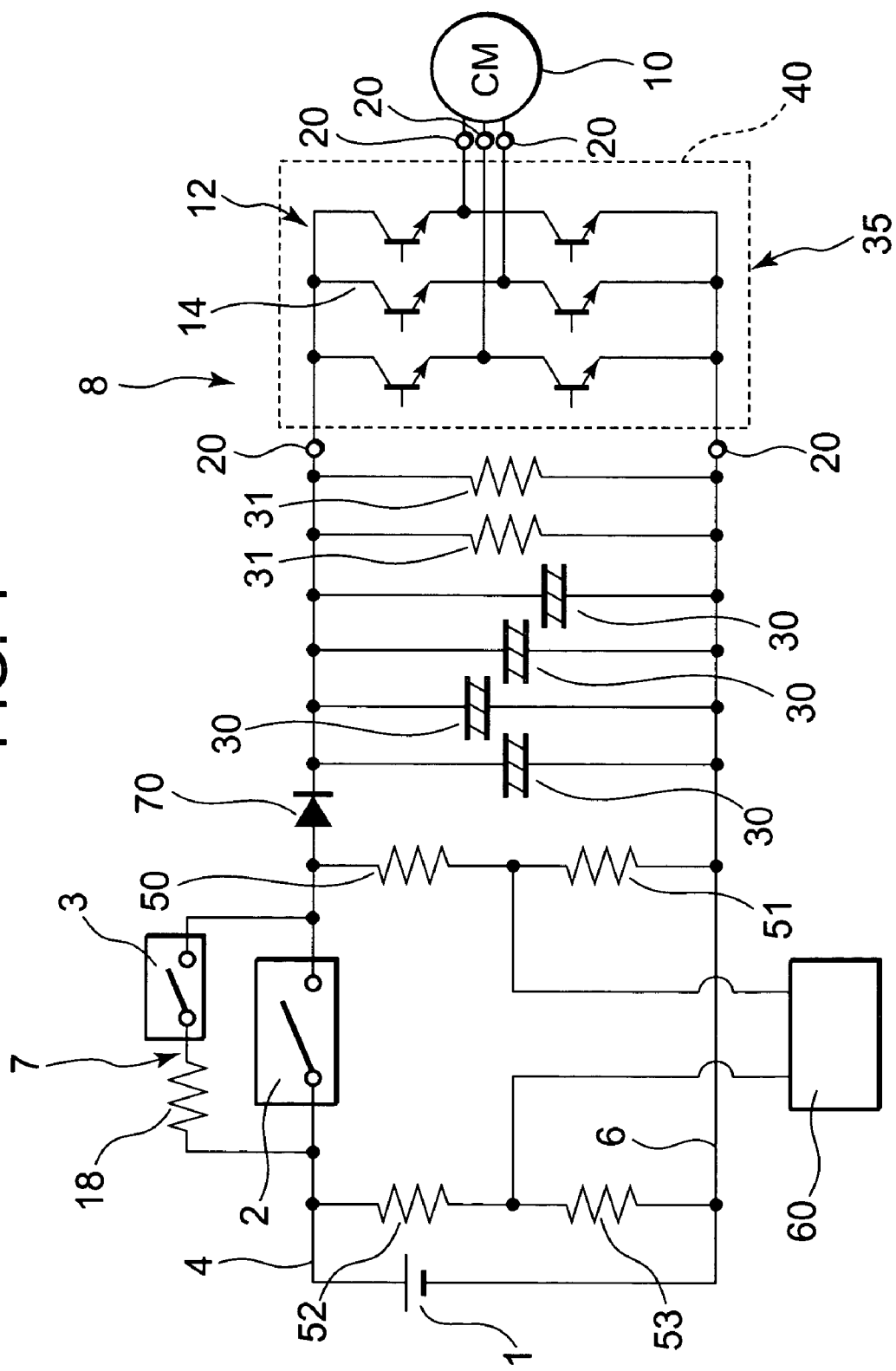
FIG. 1 is an electric circuit diagram of one embodiment of an air conditioner for an electric automobile comprising an inverter device of the present invention.

FIG. 1 is an electric circuit diagram of one embodiment of an air conditioner for an electric automobile comprising an inverter device 8 of the present invention.

In FIG. 1, 1 is a main battery as a DC power source of the electric automobile, and this provides power to an electrically driven compressor 10 of the air conditioner via the inverter device 8 of the present invention. A DC voltage is output from the battery 1, but a voltage converted into a three-phase pseudo AC is supplied to (a motor of) the electrically driven compressor 10 by an inverter module 35 (an inverter in the present invention) of the inverter device 8 described later.

The above-mentioned inverter device 8 comprises a switch 2 as a switching device, a charging circuit 7 as a charging device, four capacitors 30 . . . , discharging resistors 31, 31, the inverter module 35, and the like.

The above-mentioned inverter module 35 comprises a switching element group 12 provided in a mold package 40 to convert the voltage into the three-phase pseudo AC voltage by switching. This switching element group 12 comprises a switching element 14 and an unshown diode to absorb a switching surge, and is connected between a positive line 4 (e.g., about DC+350 V) and a negative line 6 of the battery 1.

Furthermore, the switch 2 is connected to the positive line 4 between the battery 1 and the switching element group 12. The capacitor 30 . . . stably supplies a voltage to the switching element group 12, and is interconnected in parallel between the positive line 4 that is between the switch 2 and the switching element group 12, and the negative line 6. Each of the capacitors 30 . . . is charged from the battery 1 via the charging circuit 7 described later. Further, the discharging resistor 31, 31 discharges the charged capacitor 30 . . . , and is connected between the positive line 4 that is between the capacitor 30 . . . and the switching element group 12, and the negative line 6.

The above-mentioned charging circuit 7 comprises a serial circuit of a switch 3 and a positive characteristic thermister 18, and is connected in parallel to the switch 2. This charging circuit 7 restricts an incoming current through each capacitor 30 . . . and an incoming current generated in each capacitor 30 . . . when the voltage of the battery 1 is applied.

On the other hand, the inverter device 8 is provided with voltage dividing resistors 50, 51, 52, 53 to detect voltages before and after the switch 2. That is, a serial circuit (voltage detection circuit) of the resistors 50 and 51 is connected between the positive line 4 which is located between the switch 2 and the subsequent capacitor 30 . . . , and the negative line 6 of the battery 1.

Moreover, a serial circuit (voltage detection circuit) of the resistors 52 and 53 is connected between the positive line 4 which is located between the switch 2 and the previous battery 1, and the negative line 6. The resistors 50, 51 detect the voltage after the switch 2, and the resistors 52, 53 detect the voltage before the switch 2.

Furthermore, in the embodiment, the resistor 50 and the resistor 52 have the same resistance value, and the resistor 51 and the resistor 53 also have the same resistance value. The resistance value of the resistor 50 and the resistor 52 is sufficiently greater than that of their resistors 51 and 53 connected to the negative line 6 side. Terminal voltages of the resistor 51 and the resistor 53 are then input to the controller 60. The controller 60 is a control device of the inverter device 8, and controls the turning on/off and the like of the switch 2 and the switch 3. Further, the controller 60 judges whether the switch 2 is welded in accordance with the terminal voltages of the resistor 51 and the resistor 53 described later.

It is to be noted that the inverter device 8 of the present invention is provided with a diode 70 on the positive line 4 between the serial circuit (voltage detection circuit) of the resistor 50 and the resistor 51, and the capacitor 30 . . . That is, the diode 70 is connected to the positive line 4 between a connection point of the resistor 50 and the resistor 51, and a connection point of the capacitor 30 (the capacitor 30 provided on the leftmost side in FIG. 1) disposed on a circuit closest to the switch 2, and the diode 70 is directed forward to the capacitor 30 . . . side.

It is to be noted that pins 20 . . . are attached to the mold package 40 to connect the switching element group 12 in the mold package 40 with the battery 1, the switch 2, the electrically driven compressor 10 and the like outside the mold package 40. The pins 20 . . . allow the devices inside and outside the mold package 40 to be connected without trouble.

Figure 2:
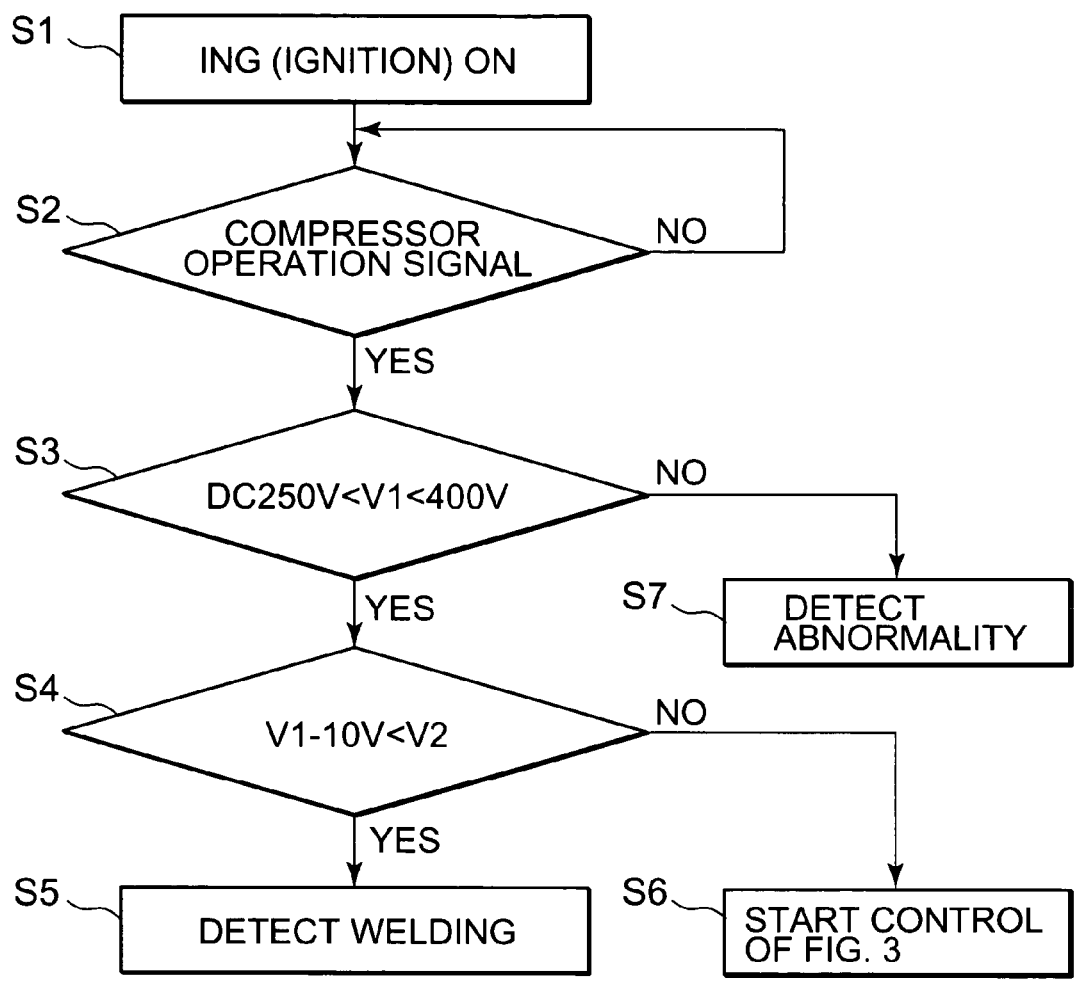
FIG. 2 is a control flow chart of a controller of the inverter device of the present invention.
Figure 3:
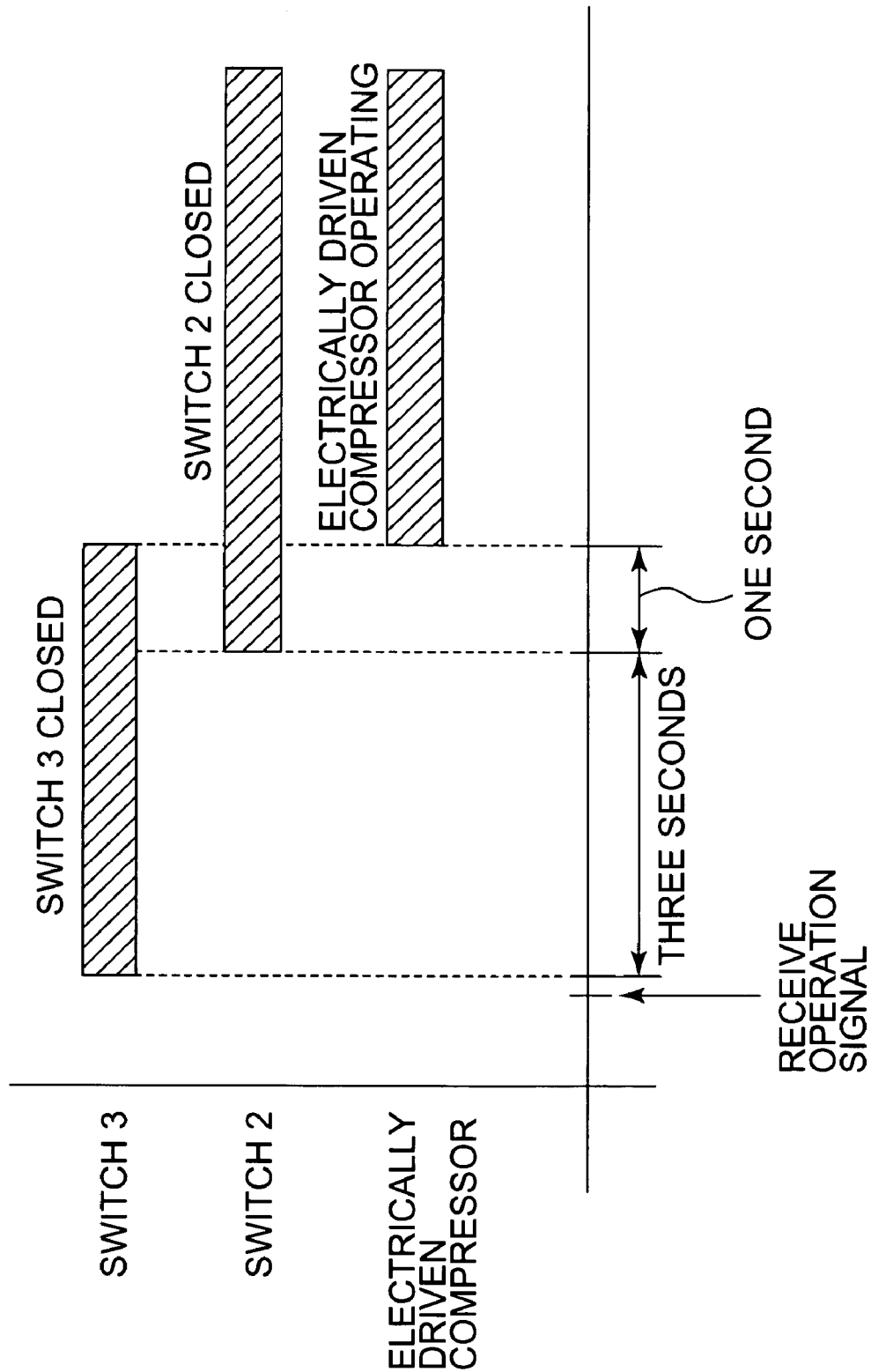
FIG. 3 is a timing chart showing the operation of a switch and an electrically driven compressor of the inverter device of the present invention.

With the configuration described above, the operation of the inverter device 8 of the present invention will next be described using FIG. 2 and FIG. 3. Here, FIG. 2 is a flow chart to explain the control regarding the operation of detecting the welding of the switch 2 performed by the controller 60 of the inverter device 8, and FIG. 3 is a timing chart to explain the operation of the switch 2, switch 3 and the electrically driven compressor 10. It is to be noted that the controller 60 controls the switches 2, 3 into an open-up state while the electric automobile is not activated.

Now, when the electric automobile is activated (ING (ignition) ON) at step S1 of FIG. 2, the controller 60 judges whether or not an operation command signal has been input from an unshown controller of the air conditioner provided in a passenger compartment, at step S2. If a temperature in the passenger compartment is presently higher than a set value and if the operation command signal is input from the controller of the air conditioner to the controller 60, the controller 60 judges whether or not a voltage V1 of the positive line 4 before the switch 2 detected in accordance with the terminal voltage of the resistor 53 before the switch 2 is higher than +250 V and lower than +400 V, at step S3. At this time, when the voltage of the battery 1 is normal, the voltage V1 of the positive line 4 before the switch 2 input to the controller 60 will be substantially the same as the voltage of the battery 1 (about +350 V as described above) regardless of whether the switch 2 is opened or closed. Therefore, if the voltage V1 input to the controller 60 is below +250 V or above +400 V, the controller 60 judges that the voltage of the battery 1 is abnormal, and the controller 60 proceeds to step S7, and stops control output to the inverter device 8 to perform a predetermined warning operation.

On the other hand, if the voltage V1 of the positive line 4 before the switch 2 input to the controller 60 is higher than 250 V and lower than 400 V at step S3 of FIG. 2, the controller 60 judges that the voltage of the battery 1 is normal, and the controller 60 proceeds to step S4, and judges whether or not a voltage V2 of the positive line 4 after the switch 2 detected in accordance with the terminal voltage of the resistor 51 after the switch 2 is higher than V1−10 V. Here, the controller 60 controls to open up the switch 2 and the switch 3 at this moment. Further, the diode 70 is directed forward to the capacitor 30 . . . side, so that even if the capacitor 30 . . . is charged, the voltage V2 of the positive line 4 after the switch 2 will be zero as long as the switch 2 and the switch 3 are in a normal state. Thus, if the voltage V2 has been higher than the voltage V1−10 V (10 V anticipating a voltage drop of the circuit) before the switch 2 and the switch 3 are controlled to be closed, it can be judged that the switch 2 or the switch 3 is welded and closed.

That is, the controller 60 compares the voltage V1 of the positive line 4 before the switch 2 with the voltage V2 of the positive line 4 after the switch 2, and if a difference therebetween (V1−V2) is within a predetermined range (range lower than 10 V in the embodiment), the controller 60 judges that the switch 2 or the switch 3 is welded and closed, and proceeds to step S5, and stops the control output to the inverter device 8 to perform the predetermined warning. In this way, the switching element 14 is not turned on, so that the motor of the compressor 10 is not conducted.

Meanwhile, if the switch 2 and the switch 3 are not welded and are open, the voltage V2 input to the controller 60 will be zero as described above, so that the difference (V1−V2) will be 10 V or higher. Therefore, if the value of the voltage V1−10 V is above the voltage V2 at step S4, the controller 60 judges that the switch 2 and the switch 3 are not welded, and proceeds from step S4 to step S6 to start the control of FIG. 3.

That is, the controller 60 first closes the switch 3 while leaving the switch 2 open (leaving the switch 2 open-up), and passes a current from the battery 1 to the capacitors 30 . . . via the positive characteristic thermister 18 and the diode 70 and charges them. The positive characteristic thermister 18 heats by itself to increase resistance, and thus serves to restrict the resistance to a value of the flowing current. This makes it possible to restrict the incoming current and protect the capacitors 30 . . . and the switching element group 12.

Next, the controller 60 closes the switch 2 at the moment when the charging of the capacitors 30 . . . is completed (in the present embodiment, three seconds after closing the switch 3), and then opens the switch 3 of the charging circuit 7 (in the present embodiment, one second after closing the switch 2), and subsequently applies the voltage of the battery 1 to the switching element group 12 via the switch 2. Moreover, the controller 60 controls the turning on/off of the switching element 14 of the switching element group 12 to generate a three-phase pseudo AC voltage at a predetermined frequency, and applies it to the motor of the electrically driven compressor 10 to drive this motor at the operation frequency.

Then, when an operation stop signal is input from the controller of the air conditioner, the controller 60 stops a switching operation of the switching element 14 of the switching element group 12, and then opens (opens up) the switch 2, stops power supply to the switching element group 12 and stops the operation of the electrically driven compressor 10. The charge given to the capacitors 30 . . . is discharged by the discharging resistor 31, 31 at a predetermined time constant, but if the switch 2 and the switch 3 are open, the voltage of the battery 1 is not applied either, so that due to the presence of the diode 70, the voltage V2 of the positive line 4 after the switch 2 will be dropped to zero the moment the switch 2 is opened.

Here, the controller 60 compares the voltage V2 with the voltage V1 also immediately after closing the switch 2, and judges whether or not the voltage V2 is higher than the voltage V1−10 V (10 V anticipating a voltage drop of the circuit) in the same way as described above. If the difference therebetween (V1−V2) is within a predetermined range (range lower than 10 V as described above), the controller 60 judges that the switch 2 or the switch 3 is welded and closed, and stops the control output to the inverter device 8 and performs the predetermined warning, as described above. In this way, the switching element 14 is not turned on, so that the motor of the compressor 10 is not conducted.

In the meantime, conventionally, even when the switch 2 is in an open state, the voltage V2 of the positive line 4 after the switch 2 will be the charged voltage of the capacitor 30 and will not be zero until the capacitor 30 is completely discharged. That is, even if the switch 2 is opened, the voltage V2 remains at a high value until the charge given to the capacitors 30 . . . is completely discharged by the discharging resistor 31, 31, so that even if the switch 2 or the switch 3 is welded, it is not possible to immediately judge this from the voltage V2.

On the other hand, by placing the diode 70 directed forward to the capacitor 30 . . . side on the positive line 4 between the connection point of the resistor 50 and the connection point of the capacitor 30 . . . as in the present invention, the current does not run in the reverse direction, so that even before the capacitor 30 . . . is completely discharged, the voltage V2 will instantly be zero as long as the switch 2 is normally opened up. In this way, even before the capacitor 30 . . . is completely discharged, it is possible to detect whether the switch 2 is opened or closed by comparing the voltage V2 with the voltage V1 as described above, so that the welding of the switch 2 and the switch 3 can be identified in early stages.

Furthermore, the diode 70 makes it possible to prevent such a disadvantage that the capacitor 30, the switching element group 12 and the like are damaged when, for example, the battery 1 is reversely connected, or that when a person touches a terminal at the battery 1 side, the person gets an electric shock because of the charged capacitor 30. This allows an improvement in the safety and reliability of the inverter device 8.

Embodiment 2

Next, another embodiment of the invention will be described using FIG. 4 and FIG. 5.

Figure 4:
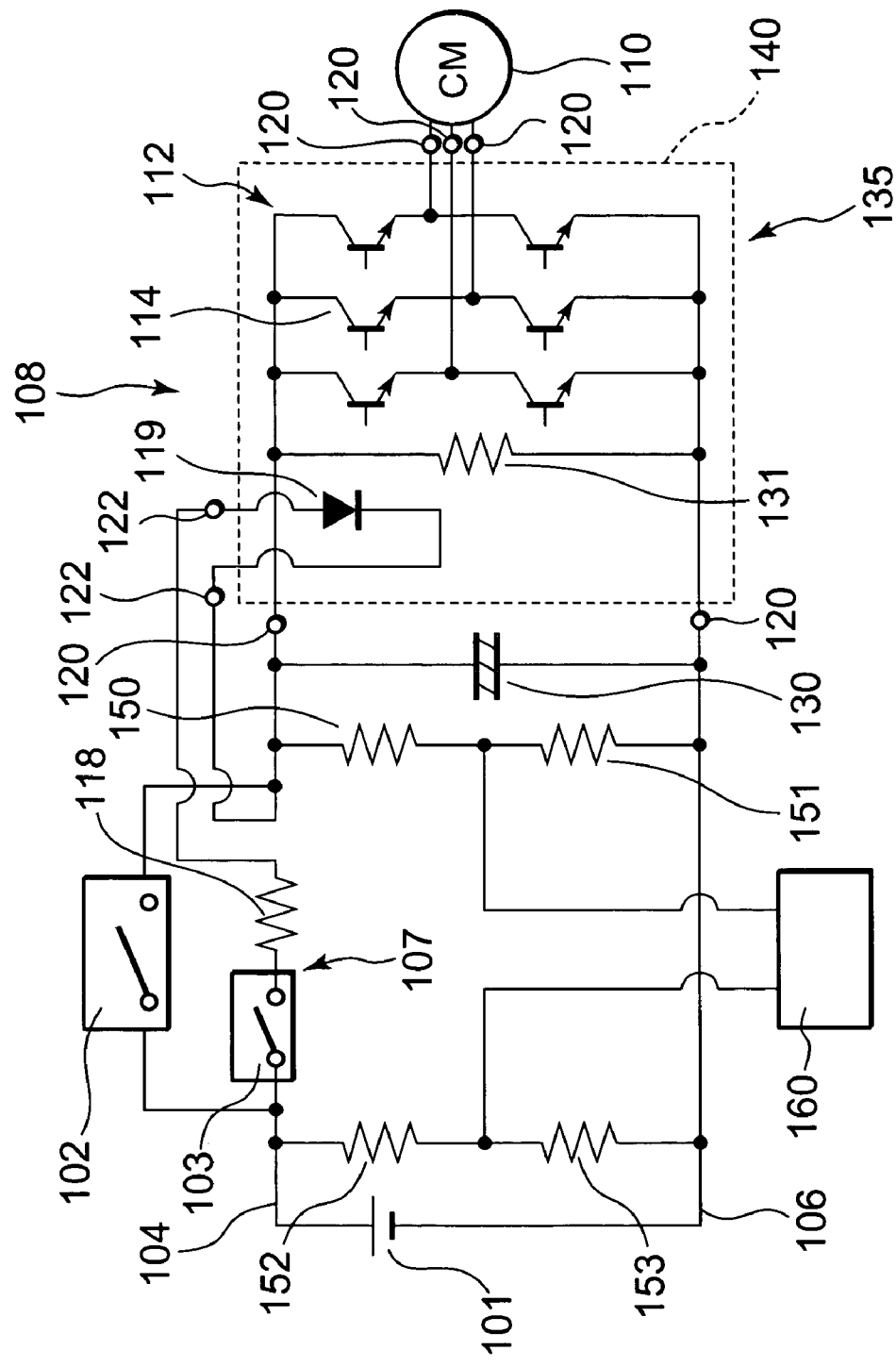
FIG. 4 is an electric circuit diagram of one embodiment of the air conditioner for the electric automobile comprising another inverter module of the present invention.
Figure 5:
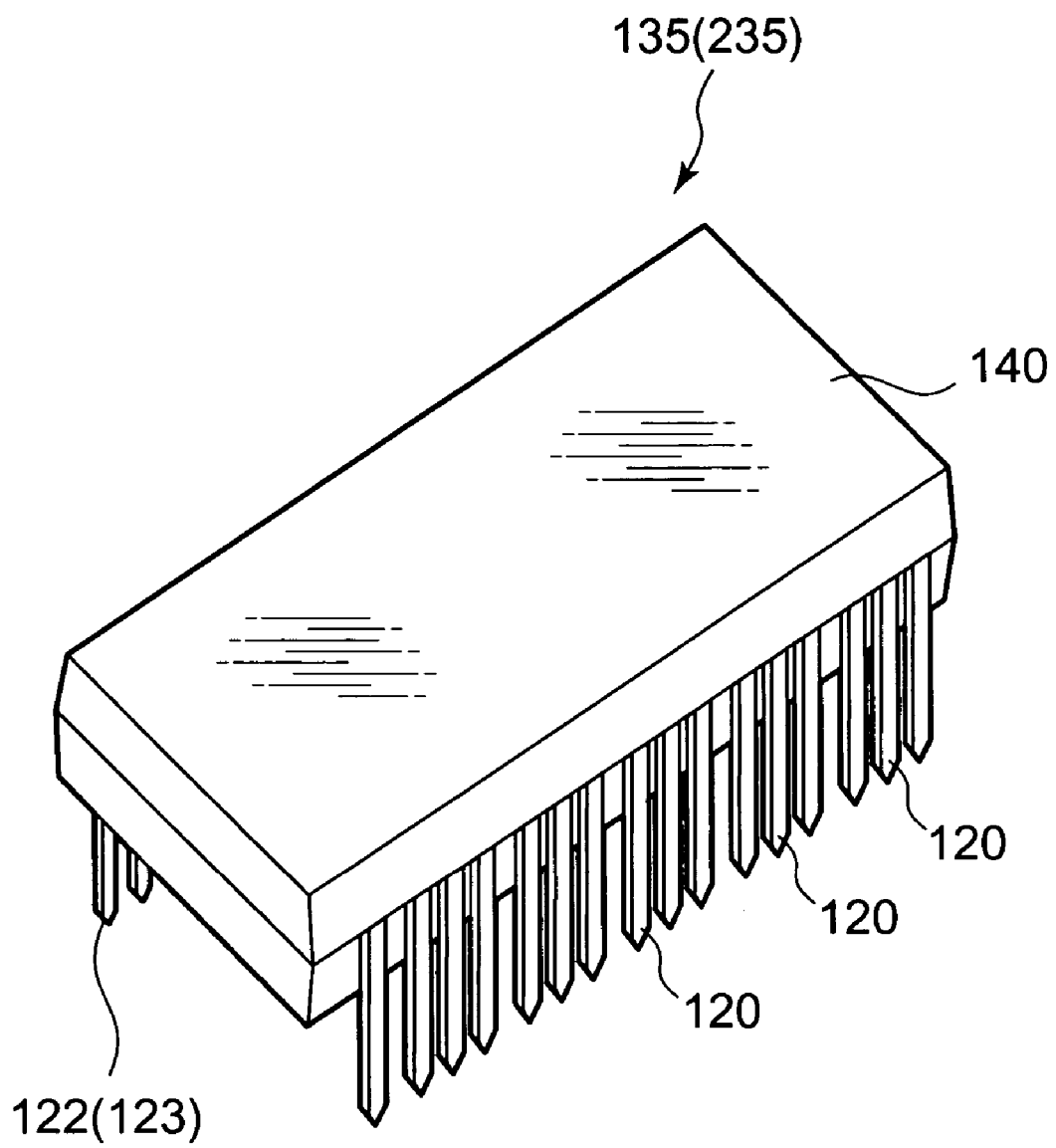
FIG. 5 is a perspective view of the inverter module of FIG. 4 molded in a mold package.

FIG. 4 shows an electric circuit diagram of the air conditioner for the electric automobile of the invention in this case, and FIG. 5 shows a perspective view of an inverter module 135 in this embodiment.

In FIG. 4, 101 is a main battery as the DC power source of the electric automobile, and this provides a DC power source to an electrically driven compressor 110 of the air conditioner via an inverter device 108 comprising a switch 102, a charging circuit 107 as a charging device, a capacitor 130, a discharging resistor 131, the inverter module 135 of the present invention, and the like. A DC voltage is output from the battery 101, but a voltage converted into a three-phase pseudo AC is supplied to the electrically driven compressor 110 by the inverter module 135 described later.

The above-described inverter module 135 comprises a switching element group 112 provided in a mold package 140 to convert the voltage into the three-phase pseudo AC voltage by switching. This switching element group 112 comprises a switching element 114 and an unshown diode to absorb a switching surge, and is connected between a positive line 104 (e.g., about DC+350 V) and a negative line 106 of the battery 101.

The switch 102 is connected to the positive line 104 between the battery 101 and the switching element group 112. The capacitor 130 stably supplies a voltage to the switching element group 112, and is connected between the positive line 104 that is between the switch 102 and the switching element group 112, and the negative line 106. Further, the discharging resistor 131 discharges the charged capacitor 30, and is connected between the positive line 104 that is between the capacitor 130 and the switching element group 112, and the negative line 106. The resistor 131 is molded into the mold package 140.

The above-mentioned charging circuit 107 comprises a serial circuit of a switch 103, a positive characteristic thermister 118 and a diode 119 described later, and is connected in parallel to the switch 102. This charging circuit 107 restricts an incoming current through the capacitor 130 and an incoming current generated in the capacitor 130 when the voltage of the battery 101 is applied.

That is, a controller 160 of the inverter device 108 first closes the switch 103 while leaving the switch 102 open (open-up) in accordance with an operation instruction from an unshown controller of the air conditioner, and passes a current from the battery 101 to the capacitor 130 via the positive characteristic thermister 118 and the diode 119, thus charging the capacitor 130. The positive characteristic thermister 118 heats by itself to increase a resistance value, and thus serves to restrict an increase in a value of the flowing current. This restricts the incoming current and protects the capacitor 130 and the switching element group 112.

Next, the controller 160 closes the switch 102 at the moment when the charging of the capacitor 130 is completed, and then opens the switch 103 of the charging circuit 107, and subsequently applies the voltage of the battery 101 to the switching element group 112 via the switch 102. The controller 160 controls the turning on/off of the switching element 114 of the switching element group 112 to generate a three-phase pseudo AC voltage at a predetermined frequency, and applies it to a motor of the electrically driven compressor 110 to drive the same.

Then, in accordance with an operation specifying command from the controller of the air conditioner, the controller 160 opens (opens up) the switch 102, and stops the operation of the electrically driven compressor 110.

On the other hand, the above-mentioned diode 119 is provided between the battery 101 and the switching element group 112 in the charging circuit 107, and directed forward to the switching element group 112 side. That is, the diode 119 in the present embodiment is placed in the charging circuit 107 of the positive line 104 to charge the capacitor 130 from the battery 101, between the battery 101 and the switching element group 112, in such a manner that the diode 119 is directed forward to the capacitor 130 side.

The diode 119 makes it possible to prevent such a disadvantage that when, for example, the battery 101 is reversely connected, a reverse voltage is applied via the charging circuit 107, and the capacitor 130 and the switching element group 112 are damaged, or that when a hand of a person touches a terminal at the battery 101 side, the person gets an electric shock.

Furthermore, in the present invention, the above-described diode 119 is integrally molded in the mold package 140 together with the switching element group 112.

Here, such a diode has heretofore been disposed on a circuit board, which has caused a problem that the inverter device is enlarged. On the other hand, if the inverter device is installed on a vehicle to drive the electrically driven compressor of the air conditioner for the electric automobile as in the present embodiment, it is necessary to reduce its size because it has to be placed in a small engine room having limited installation space.

Therefore, the diode 119 is integrally molded in the mold package 140 as in the present invention, so that the inverter device 108 can be significantly reduced in size. In this way, the installation space for the inverter device 108 comprising the inverter module 135 can be reduced.

Furthermore, the molding of the diode 119 also allows heat release of the diode 119 to be performed by heat release means (such as a heat release fin) of the inverter module 135. Thus, it is not necessary to place extra heat release means for the heat release of the resistor, and the number of components can be reduced. Further, an insulation distance of the diode 119 can be secured. It is thus possible to provide the high-performance inverter module 135.

On the other hand, the inverter device 108 is provided with voltage dividing resistors 150, 151, 152, 153 to detect voltages before and after the switch 102. That is, a serial circuit (voltage detection circuit) of the resistors 150 and 151 is connected between the positive line 104 which is located between the switch 102 and the subsequent capacitor 130, and the negative line 106 of the battery 101.

Moreover, a serial circuit (voltage detection circuit) of the resistors 152 and 153 is connected between the positive line 104 which is located between the switch 102 and the previous battery 101, and the negative line 106. The resistors 150, 151 detect the voltage after the switch 102, and the resistors 152, 153 detect the voltage before the switch 102.

Furthermore, in the embodiment, the resistor 150 and the resistor 152 have the same resistance value, and the resistor 151 and the resistor 153 also have the same resistance value. The resistance value of the resistor 150 and the resistor 152 is sufficiently greater than that of their resistors 151 and 153 connected to the negative line 106 side. Terminal voltages of the resistor 151 and the resistor 153 are then input to the controller 160.

Here, in a state where the battery 101 is connected, the terminal voltage V1 of the resistor 151 input to the controller 160 is substantially the voltage of the battery 101, regardless of whether the switch 102 is opened or closed. In a state where the capacitor 130 is completely discharged, the terminal voltage V2 of the resistor 153 input to the controller 160 will be zero if the switch 102 is opened, and the voltage V2 will be substantially the voltage V1 (with a slight voltage drop) when the switch 102 is closed. This makes it possible to detect whether the switch 102 is opened or closed from the terminal voltages V1, V2 of the resistor 151, the resistor 153 input to the controller 160. It is thus possible to judge the state where the switch 102 is closed even though the switch 102 is controlled to be opened by the controller 160, the so-called welding of the switch 102.

It is to be noted that pins 120 . . . are attached to the mold package 140 to connect the switching element group 112 and the discharging resistor 131 in the mold package 140 with the battery 101, the switch 102 and the electrically driven compressor 110 outside the mold package 140. These pins 120 . . . allow the devices inside and outside the mold package 140 to be connected without trouble.

Furthermore, a pin 122 is also attached to the mold package 140 to connect the diode 119 to the charging circuit 107 outside the mold package 140. The pins 122, 122 allow the diode 119 to be connected without trouble to the charging circuit 107 before the capacitor 130 outside the mold package 140 even when the diode 119 is provided in the mold package 140 as in the present invention.

Embodiment 3

Figure 6:
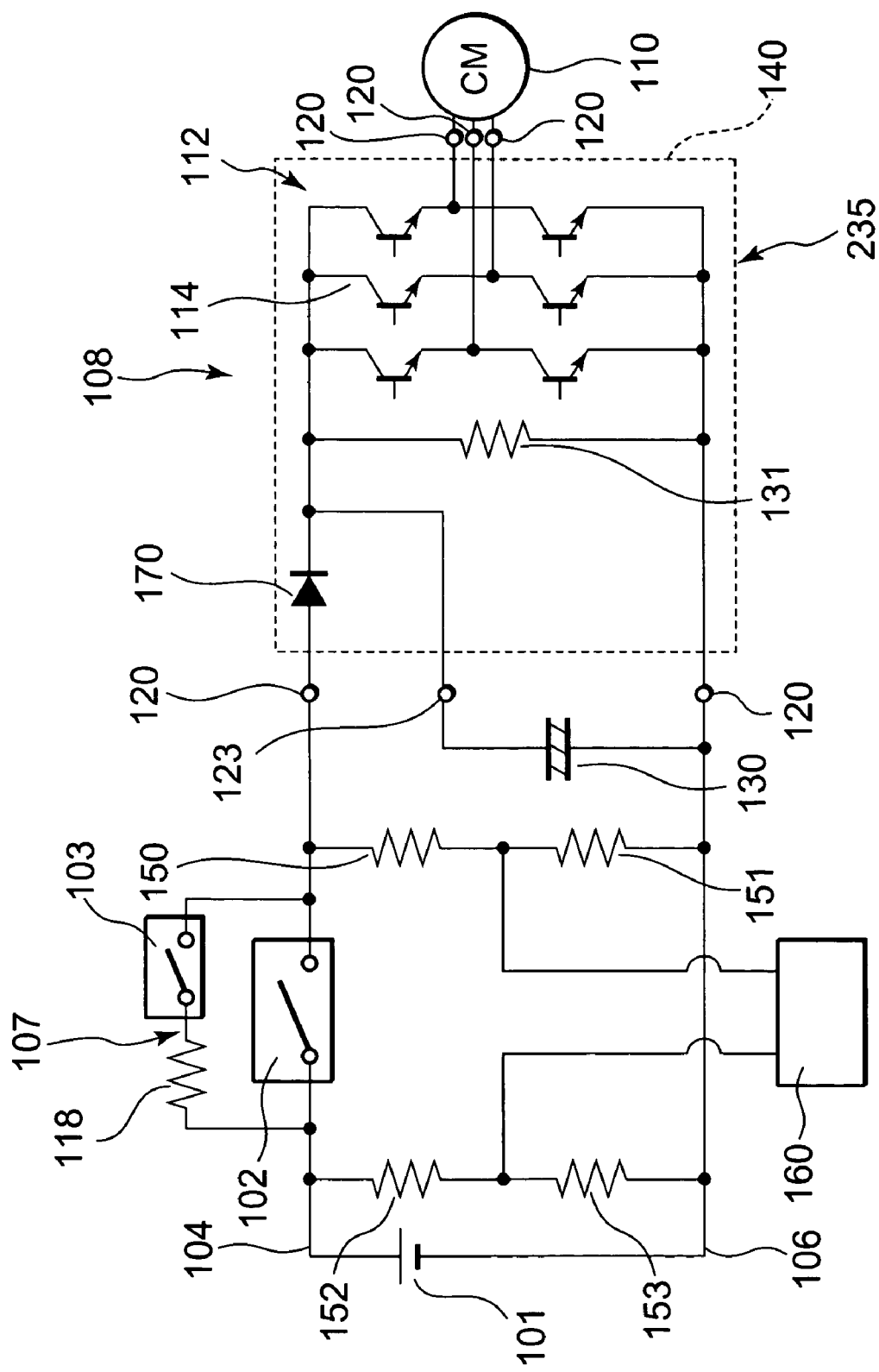
FIG. 6 is an electric circuit diagram of another embodiment of the air conditioner for the electric automobile comprising an inverter module of the invention in FIG. 4.
Figure 7:
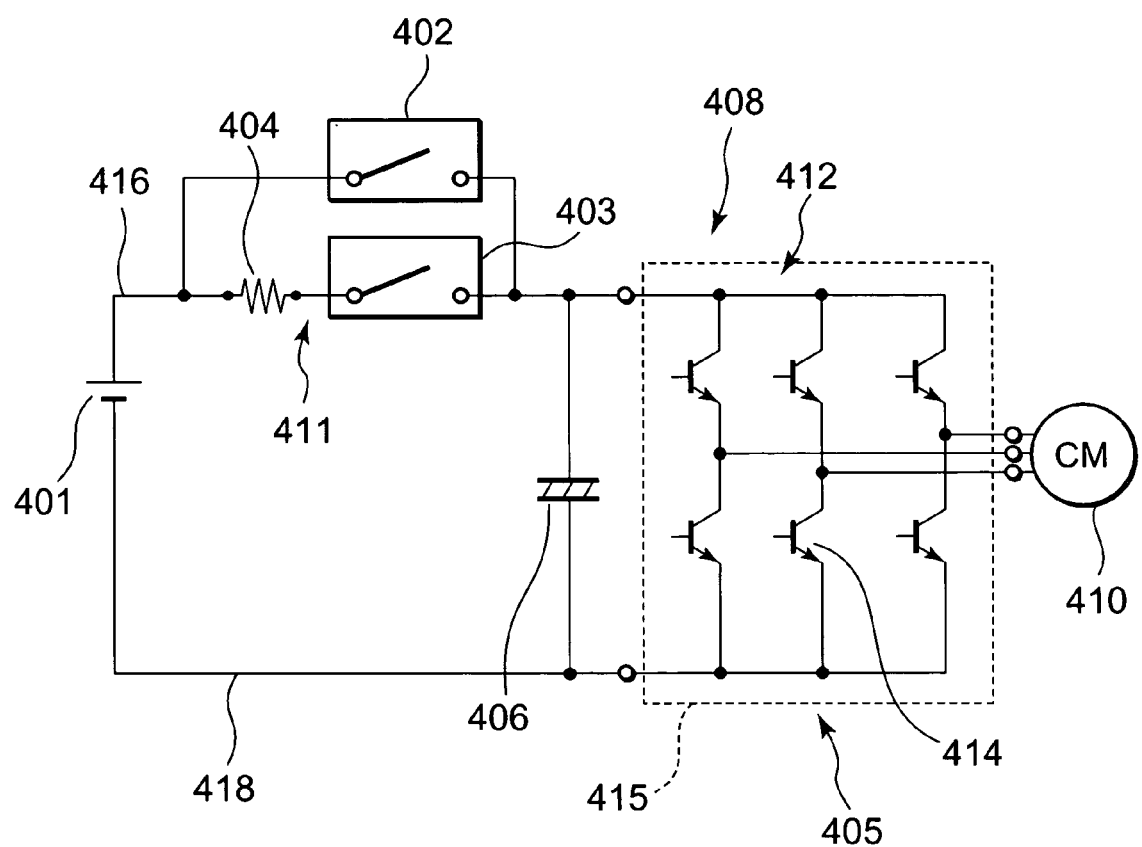
FIG. 7 is an electric circuit diagram of an air conditioner for an electric automobile comprising a conventional inverter device.

Next, another embodiment of the inverter module will be described using FIG. 6. FIG. 6 shows an electric circuit diagram of one embodiment of the air conditioner for the electric automobile comprising an inverter module 235 in this case. It is to be noted that in FIG. 6, those assigned with the same sings as in FIG. 4 and FIG. 5 have the same or similar effects.

In FIG. 6, 235 is the inverter module of the present embodiment, and a voltage converted into a three-phase pseudo AC by the inverter module 235 is supplied to the electrically driven compressor 110.

This inverter module 235 comprises the switching element group 112 provided in the mold package 140 to convert the voltage into the three-phase pseudo AC voltage by switching, as in the embodiments described above. This switching element group 112 comprises the switching element 114 and an unshown diode to absorb a switching surge, and is connected between the positive line 104 (about DC+350 V) and the negative line 106 of the battery 101.

Here, the inverter module 235 of the present embodiment has a built-in diode 170. This diode 170 is provided between the battery 101 and the switching element group 112, and directed forward to the switching element group 112 side. The diode 170 in the present embodiment is provided on the positive line 104 between the serial circuit (voltage detection circuit) of the resistor 150 and the resistor 151, and the capacitor 130. That is, the diode 170 is connected to the positive line 104 between a connection point of the resistor 150 and the resistor 151, and a connection point of the capacitor 130, and the diode 170 is directed forward to the capacitor 130 . . . side.

It is to be noted that the pins 120 . . . are attached to the mold package 140 to connect the switching element group 112 in the mold package 140 with the battery 101, the switch 102, the electrically driven compressor 110 and the like outside the mold package 140. These pins 120 . . . allow the devices inside and outside the mold package 140 to be connected without trouble.

Furthermore, there is also provided a pin 123 to connect, to a forward side of the diode 170, the capacitor 130 charged from the battery 101 via the charging circuit 107, as described above. The pin 123 allows the capacitor 130 to be connected without trouble to the forward side of the diode 170 in the mold package 140. It is to be noted that this pin 123 is provided as shown in FIG. 5 in the same way as the pin 122 described above.

With the configuration described above, the operation of the inverter device 108 of the present invention will next be described using FIG. 2 and FIG. 3 described above. It is to be noted that the controller 160 controls the switches 102, 103 into an open-up state while the electric automobile is not activated.

Now, when the electric automobile is activated (ING (ignition) ON) at step S1 of FIG. 2, the controller 160 judges whether or not an operation command signal has been input from the unshown controller of the air conditioner provided in the passenger compartment, at step S2. If the temperature in the passenger compartment is presently higher than the set value and if the operation command signal is input from the controller of the air conditioner to the controller 160, the controller 160 judges whether or not the voltage V1 of the positive line 104 before the switch 102 detected in accordance with the terminal voltage of the resistor 153 before the switch 102 is higher than +250 V and lower than +400 V, at step S3. At this time, when the voltage of the battery 101 is normal, the voltage V1 of the positive line 104 before the switch 102 input to the controller 160 will be substantially the same as the voltage of the battery 101 (about +350 V as described above) regardless of whether the switch 102 is opened or closed. Therefore, if the voltage V1 input to the controller 160 is below +250 V or above +400 V, the controller 160 judges that the voltage of the battery 101 is abnormal, and the controller 160 proceeds to step S7, and stops the control output to the inverter device 108 to perform a predetermined warning operation.

On the other hand, if the voltage V1 of the positive line 104 before the switch 102 input to the controller 160 is higher than 250 V and lower than 400 V at step S3 of FIG. 2, to the controller 160 judges that the voltage of the battery 1 is normal, and the controller 160 proceeds to at step S4, and judges whether or not the voltage V2 of the positive line 104 after the switch 102 detected in accordance with the terminal voltage of the resistor 151 after the switch 102 is higher than V1–10 V. Here, the controller 160 controls to open up the switch 102 and the switch 103 at this moment. Further, the diode 170 is directed forward to the capacitor 130 side, so that even if the capacitor 130 is charged, the voltage V2 of the positive line 104 after the switch 102 will be zero as long as the switch 102 and the switch 103 are in a normal state. Thus, if the voltage V2 has been higher than the voltage V1–10 V (10 V anticipating a voltage drop of the circuit) before the switch 102 and the switch 103 are controlled to be closed, it can be judged that the switch 102 or the switch 103 is welded and closed.

That is, the controller 160 compares the voltage V1 of the positive line 104 before the switch 102 with the voltage V2 of the positive line 104 after the switch 102, and if a difference therebetween (V1–V2) is within a predetermined range (range lower than 10 V in the embodiment), the controller 60 judges that the switch 102 or the switch 103 is welded and closed, and proceeds to step S5, and stops the control output to the inverter device 108 to perform the predetermined warning. In this way, the switching element 114 is not turned on, so that the motor of the compressor 110 is not conducted.

Meanwhile, if the switch 102 and the switch 103 are not welded and are open, the voltage V2 input to the controller 160 will be zero as described above, so that the difference (V1–V2) will be 10 V or higher. Therefore, if the value of the voltage V1–10 V is above the voltage V2 at step S4, the controller 60 judges that the switch 102 and the switch 103 are not welded, and proceeds from step S4 to step S6 to start the control of FIG. 3.

That is, the controller 160 first closes the switch 103 while leaving the switch 102 open (leaving the switch 102 open-up), and passes a current from the battery 101 to the capacitors 130 via the positive characteristic thermistor 118 and the diode 170 and charges them. The positive characteristic thermistor 118 heats by itself to increase resistance, and thus serves to restrict the resistance to a value of the flowing current. This makes it possible to restrict the incoming current and protect the capacitors 130 and the switching element group 112.

Next, the controller 160 closes the switch 102 at the moment when the charging of the capacitor 130 is completed (in the present embodiment, three seconds after closing the switch 103), and then opens the switch 103 of the charging circuit 107 (in the present embodiment, one second after closing the switch 102), and subsequently applies the voltage of the battery 101 to the switching element group 112 via the switch 102. Moreover, the controller 160 controls the turning on/off of the switching element 114 of the switching element group 112 to generate a three-phase pseudo AC voltage at a predetermined frequency, and applies it to the motor of the electrically driven compressor 110 to drive this motor at the operation frequency.

Then, when an operation stop signal is input from the controller of the air conditioner, the controller 160 opens (opens up) the switch 102 to stop the power supply to the switching element group 112, and stops the operation of the electrically driven compressor 110. The charge given to the capacitors 130 is discharged by the discharging resistor 131 at a predetermined time constant, but if the switch 102 and the switch 103 are open, the voltage of the battery 101 is not applied either, so that due to the presence of the diode 170, the voltage V2 of the positive line 104 after the switch 102 will be dropped to zero the moment the switch 102 is opened.

Here, the controller 160 compares the voltage V2 with the voltage V1 also immediately after closing the switch 102, and judges whether or not the voltage V2 is higher than the voltage V1–10 V (10 V anticipating a voltage drop of the circuit) in the same way as described above. If the difference therebetween (V1–V2) is within a predetermined range (range lower than 10 V as described above), the controller 160 judges that the switch 102 or the switch 103 is welded and closed, and stops the control output to the inverter device 108 and performs the predetermined warning, as described above. In this way, the switching element 114 is not turned on, so that the motor of the compressor 110 is not conducted.

In the meantime, conventionally, even when the switch 102 is in an open state, the voltage V2 of the positive line 104 after the switch 102 will be the charged voltage of the capacitor 130 and will not be zero until the capacitor 130 is completely discharged. That is, even if the switch 102 is opened, the voltage V2 remains at a high value until the charge given to the capacitors 130 is completely discharged by the discharging resistor 131, so that even if the switch 102 or the switch 103 is welded, it is not possible to immediately judge this from the voltage V2.

On the other hand, by placing the diode 170 directed forward to the capacitor 130 side on the positive line 104 between the connection point of the resistor 150 and the connection point of the capacitor 130, the current does not run in the reverse direction, so that even before the capacitor 130 is completely discharged, the voltage V2 will instantly be zero as long as the switch 102 is normally opened up. In this way, even before the capacitor 130 is completely discharged, it is possible to detect whether the switch 102 is opened or closed by comparing the voltage V2 with the voltage V1 as described above, so that the welding of the switch 102 and the switch 103 can be identified in early stages.

Furthermore, the diode 170 makes it possible to prevent such a disadvantage that the capacitor 130, the switching element group 112 and the like are damaged when, for example, the battery 101 is reversely connected, or that when a person touches a terminal at the battery 101 side, the person gets an electric shock because of the charged capacitor 130. This allows an improvement in the safety and reliability of the inverter device 108.

Still further, the diode 170 is integrally molded in the mold package 140 as described above, so that the inverter device 108 can be significantly reduced in size. In this way, the installation space for the inverter device 108 comprising the inverter module 235 can be reduced.

Further yet, the molding of the diode 170 also allows heat release of the diode 170 to be performed by heat release means (such as a heat release fin) of the inverter module 235. Thus, it is not necessary to place extra heat release means for the heat release of the resistor, and the number of components can be reduced. Further, an insulation distance of the diode 170 can be secured. It is thus possible to provide the high-performance inverter module 235.

Thus, the diode 170 is integrally molded in the mold package 140 as in the present embodiment, so that the inverter device 108 can be significantly reduced in size. In this way, the installation space for the inverter device 108 comprising the inverter module 235 can be reduced.

Furthermore, the molding of the diode 170 also allows heat release of the diode 170 to be performed by heat release means (such as a heat release fin) of the inverter module 235. Thus, it is not necessary to place extra heat release means for the heat release of the resistor, and the number of components can be reduced. Further, the insulation distance of the diode 170 can be secured. It is thus possible to provide the high-performance inverter module 235.

It is to be noted that the charging circuits 107 are provided with the switches 103, respectively, in the embodiments described above, but this is not a limitation, and the switches may not be provided in the charging circuits 107 but may be provided on the positive lines 104 immediately after the batteries 101 (before the switch 2), respectively. Moreover, the numerical values shown in the embodiments are not limited.

What is claimed is:

1. An inverter module comprising a switching element group provided in a mold package to convert a DC voltage into a three-phase pseudo AC voltage by switching, the module further comprising:
   a diode provided between a DC power source and the switching element group and directed forward to the switching element group side;
   wherein the diode is integrally molded into the mold package.

2. The inverter module according to claim 1, wherein there is provided a pin to connect, to a forward side of the diode, a capacitor charged from the DC power source via a charging device.

3. An inverter device comprising:
   an inverter coupled to a capacitor;
   a charging circuit connected to a DC power source and coupled to the capacitor via a diode;
   a switch connected in parallel with the charging circuit; and
   a voltage detection circuit for detecting voltage taken from a node between the switch and the diode.

4. The inverter device according to claim 3, comprising a controller which judges whether the switching device is welded in accordance with a voltage detected by the voltage detection circuit.

5. The inverter device according to claim 4, wherein the controller compares a voltage detected from a node between the DC power source and the switching device with the voltage detected by the voltage detection circuit, and when a difference therebetween is within a predetermined range, judges that the switching device is welded.

* * * * *